No. 675,730. Patented June 4, 1901.
W. H. HAMMON.
PIPE COUPLING.
(Application filed Apr. 6, 1901.)
(No Model.)
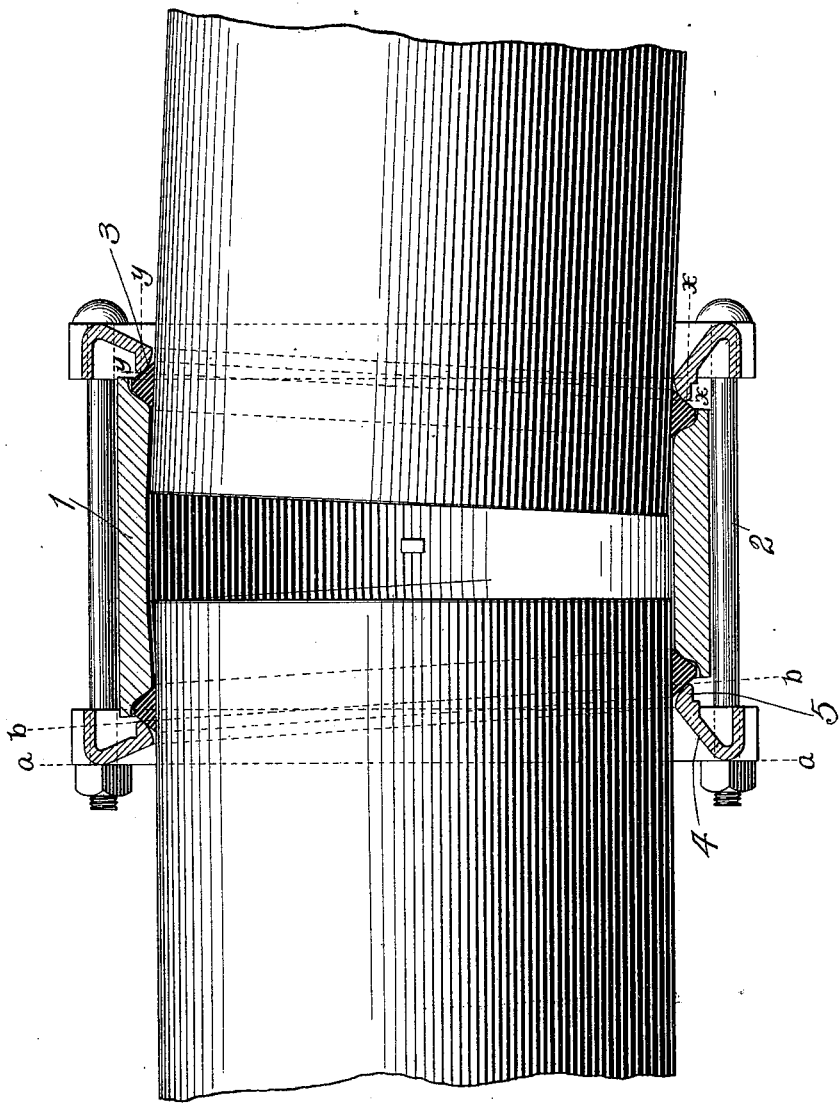
WITNESSES:
Herbert Bradley
F. M. Dapper
INVENTOR
William H. Hammon
by Darwin S. Wolcott Att'y.

UNITED STATES PATENT OFFICE.

WILLIAM H. HAMMON, OF PITTSBURG, PENNSYLVANIA.

PIPE-COUPLING.

SPECIFICATION forming part of Letters Patent No. 675,730, dated June 4, 1901.

Application filed April 6, 1901. Serial No. 54,622. (No model.)

*To all whom it may concern:*

Be it known that I, WILLIAM H. HAMMON, a citizen of the United States, residing at Pittsburg, in the county of Allegheny and State of Pennsylvania, have invented or discovered certain new and useful Improvements in Pipe-Couplings, of which improvements the following is a specification.

In Letters Patent granted to me April 9, 1901, and numbered 671,696, I have described and shown certain improvements in pipe-couplings, one of whose characteristics consists in making the coupling-sleeve with its ends lying in planes other than right angles to the axis of the sleeve. Such a construction involved when the ordinary follower-rings were used the employment of different sizes of bolts in order to draw the follower-rings, by which the packings are compressed in the sleeve, toward each other in effecting a coupling.

The object of the present invention is to provide a follower-ring of such a construction as will permit the employment of bolts of the same or approximately the same length for making a joint, using the sleeve described in the patent referred to.

The invention is hereinafter more fully described and claimed.

In the accompanying drawing is shown a sectional elevation of a pipe-coupling embodying my improvements.

In the practice of my invention the sleeve 1 is constructed, as regards the ends thereof, so that such ends will lie in planes at an angle to the axis of the sleeve other than a right angle. Such planes may converge toward each other or be parallel, as shown and described in the patent referred to.

As will be seen by reference to the drawing, the bolts 2, employed for drawing the follower-rings toward each other to compress the packing 3, would, if the follower-rings were of the same width throughout, have to be of different lengths. In order to avoid this objectionable feature, the follower-rings 4 are so constructed that the plane indicated by the line $a\ a$ passing through the points of bearing of the nuts or bolt-heads will be at an angle with the plane indicated by the line $b\ b$ coinciding with the face of the ring bearing on the packing. In other words, the rings gradually diminish in width in both directions from the line $x\ x$ of maximum width to the line $y\ y$ of minimum width. By the use of such sleeves the coupling, including the sleeve and followers, will be of substantially uniform width, and bolts of the same or approximately the same length can be used in forming the joint. It is preferred to form a continuous rib 5 on the inner faces of the follower-rings, so as to effect a lateral spreading of the packing-rings.

It will be understood that the follower-ring is preferably constructed so that the plane of one end or face will be at or approximately at right angles to the axis of the ring, while the plane of the other end or face will be at the same angle to the axis of the ring as that formed by the plane of the corresponding end of the sleeve with the axis of the latter.

I claim herein as my invention—

A pipe-coupling having in combination, sleeves having their ends in planes at angles other than right angles to the axis of the sleeve, packing-rings and follower-rings having their inner ends or faces at angles to their axes, corresponding or approximately corresponding to the angles which the planes of the complemental ends of the sleeve form with the axis of the sleeve, substantially as set forth.

In testimony whereof I have hereunto set my hand.

WILLIAM H. HAMMON.

Witnesses:
DARWIN S. WOLCOTT,
F. E. GAITHER.